United States Patent [19]
Kato et al.

[11] Patent Number: 5,253,134
[45] Date of Patent: Oct. 12, 1993

[54] THIN-FILM MAGNETIC HEAD

[75] Inventors: Yoshiaki Kato; Noboru Komori, both of Minami Ashigara, Japan

[73] Assignee: Fuji Photo Film Co., Ltd., Kanagawa, Japan

[21] Appl. No.: 697,162

[22] Filed: May 8, 1991

[30] Foreign Application Priority Data

May 9, 1990 [JP] Japan .................................. 2-117706
Jul. 20, 1990 [JP] Japan .................................. 2-190628

[51] Int. Cl.$^5$ .............................................. G11B 5/47
[52] U.S. Cl. .................................................. 360/126
[58] Field of Search .............................. 360/125–126, 360/103

[56] References Cited

U.S. PATENT DOCUMENTS

| | | | |
|---|---|---|---|
| 4,380,784 | 4/1983 | Desserre | 360/126 |
| 4,807,076 | 2/1989 | Nakashima | 360/126 |
| 4,953,051 | 8/1990 | Wada | 360/126 |

FOREIGN PATENT DOCUMENTS 1116910 5/1989 Japan .

Primary Examiner—A. J. Heinz
Attorney, Agent, or Firm—Sughrue, Mion, Zinn, Macpeak & Seas

[57] ABSTRACT

A thin-film magnetic head comprising a substrate formed of a material having an electric resistivity of not higher than 150 ohm-cm and an electromagnetic transducer unit, the transducer unit is formed on the substrate and comprises a lower magnetic film directly attached to the substrate, a magnetic gap layer, a coil conductor layer, at least an insulating layer and an upper magnetic layer. The lower magnetic film is formed as a flat surface extending over the coil conductor layer, and parts, neighboring the magnetic gap region, of the end face directed to the recording medium are receded with the insulating layer being inorganic material.

9 Claims, 8 Drawing Sheets

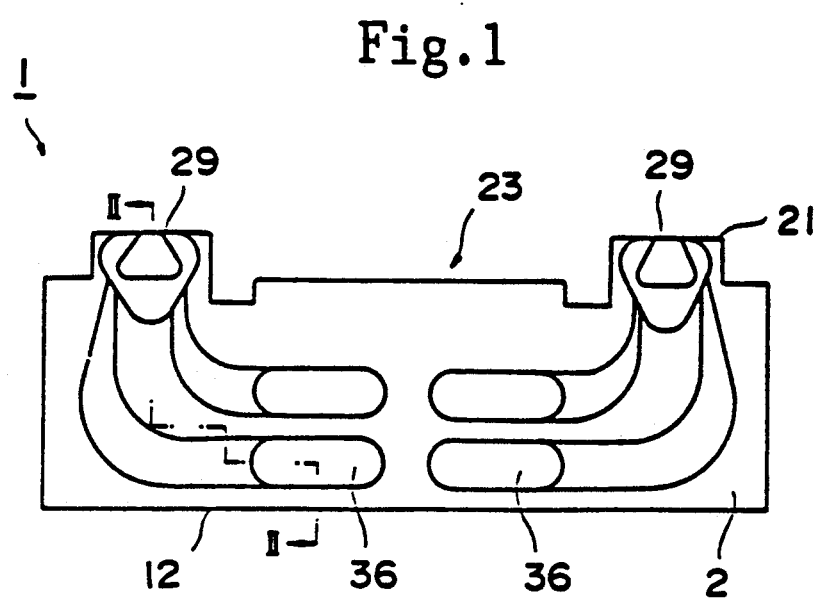
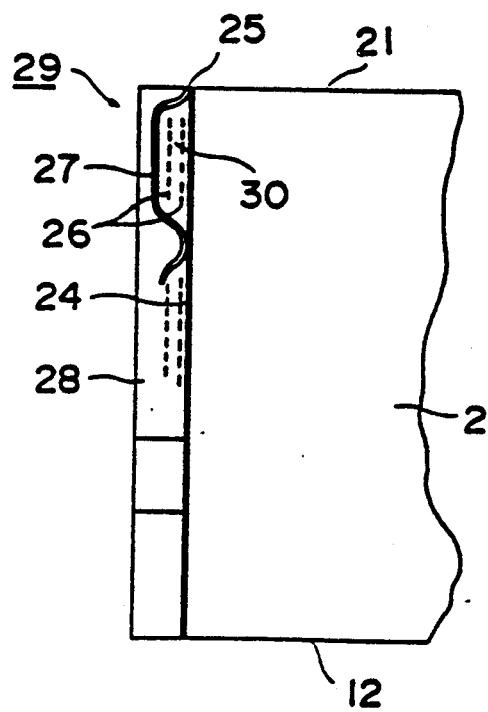

THIN-FILM MAGNETIC HEAD

FIELD OF THE INVENTION

This invention relates to a thin-film magnetic head. More particularly, according to a first aspect of the present invention, it relates to a thin-film magnetic head having a construction capable of preventing dielectric breakdown otherwise caused by static electricity, and according to a second aspect of the invention, it relates to an improved structure of a lower magnetic film of the thin film magnetic head.

BACKGROUND AND RELATED ART

Recently, in keeping with the tendency towards the higher recording density of magnetic recording signals, shorter recording signal wavelengths, narrower recording track widths and higher access speeds to the recording medium have been realized. For this reason, the recent tendency is to use thin-film magnetic head which are compact and which have high frequency characteristics as compared to conventional magnetic heads employing bulk magnetic materials.

In general, as regards the First Aspect, a thin-film magnetic head is constituted by a lower magnetic film formed on a substrate by the interposition of an insulating film, coil conductor layers, a second insulating layer, a gap layer and an upper magnetic film. The thicknesses of these layers or films are of the order of microns and, for further improving the aforementioned properties, an increasing demand is raised towards further reducing the thicknesses of the layers and films.

When the thin-film magnetic head is built into a magnetic storage system and reads or write the magnetic information in the state of being floated above or slidingly contacted with a magnetic recording medium, it may occur frequently that the static electricity generated on the recording medium be transferred towards the magnetic head, or the static electricity be generated between the magnetic recording medium and the magnetic head, as a result of which electrostatic charges tend to be deposited on the electromagnetic transducer units.

If the electromagnetic transducer units are charged electrically in this manner, the electrostatic charges tend to be collected on the lower magnetic film, on account of the specific construction of the electromagnetic transducer units. The electrostatic charges thus collected on the lower magnetic film tends to raise the electrical potential of the lower magnetic film to offer dielectric breakdown to the insulating layer provided between the lower magnetic film and the substrate, the electrostatic charges then reaching the substrate to cause the destruction of the thin-film magnetic head.

It may also occur that static electricity be produced while the head is in transport or temporarily stored by itself in readiness for being mounted in the magnetic storage system. Such static electricity is known to be discharged momentarily on attaching the magnetic head to the magnetic storage system to cause similarly the destruction of the thin-film magnetic head.

In the JP Patent KOKAI Publication No. 1-116910, there is disclosed a thin-film magnetic head capable of preventing the dielectric breakdown of the insulating layer by the static charges collected on the lower magnetic head. With this thin-film magnetic head, shown herein in FIG. 3, a metallic film 14 is provided on a chamfered portion (A) of a surface 12 of the magnetic head opposite to the floating surface of the slider for shorting an insulating layer 33 interposed between the substrate 2 and the lower magnetic film 24 of the electromagnetic transducer unit 9.

As regards the Second Aspect, conventional thin-film magnetic head used for a hard disc apparatus is explained by referring to FIGS. 11 and 12. On a substrates, formed of a magnetic or non-magnetic material, there are step by step formed a lower magnetic film 3 of a soft magnetic material, insulating layer 4 of an organic resist material, a coil conductor layer 5 of an electrically conductive material, such as Cu, and an upper magnetic layer 6 of a soft magnetic material similar to that of the lower magnetic film 3. Between an upper magnetic pole formed by the upper magnetic film 6 and a lower magnetic pole formed by the lower magnetic film 3, there is defined a magnetic gap 7 on the side of a floating surface 21 of the substrate 2 facing a magnetic recording medium, not shown.

DISCUSSION OF THE RELATED ART

As regards the First Aspect, it will be understood from FIG. 3 that, in the thin-film magnetic head of the above Publication, it is necessary to provide a step of chamfering the substrate 2 and the electromagnetic transducer unit 9 and a step of forming a metallic film 14 on the chamfered surface. Meanwhile, the provision of such steps of chamfering and forming the metallic film 14 is contrary to the demand for simplifying the magnetic head production process and lowering the production costs and hence leads unavoidably to increased production costs.

As regards the Second Aspect, for preparing the above described thin-film magnetic head, a predetermined magnetic pole pattern having a shape as shown in FIG. 8 is formed by a resist (photoresist) of an organic material. The lower magnetic film 3 is then formed on the pattern, such as by plating, and a resist formed of the same organic material as that of the resist of the magnetic pole pattern is applied on the lower magnetic film 3 so that the region of the resist which has been left and cured and the surface region of the lower magnetic film 3 will form a flat upper surface 4a. On this flat upper surface 4a, a coil conductor layer 5 consisting of a coil part 5a and a lead wire part 5b, an insulating layer 4, and the other lead wire part 5c, are formed in this order. An upper magnetic film 6, which becomes an upper magnetic pole, is formed in a region facing the lower magnetic pole 3.

In the above described thin-film magnetic head, the resist of the organic material is used as an insulator between the turns of the coil conductor layer 5 and between the coil conductor layer and the upper and lower magnetic films. In general, the organic material has such defects that it is inferior in thermal resistance, moisture-proofness and resistance to chemicals and hence may be deteriorated by prolonged use, so that the insulation between the conductor layers and the magnetic layers tends to suffer dielectric breakdown to lower the operational reliability of the thin-film magnetic head.

SUMMARY OF THE DISCLOSURE (First Aspect)

In view of the foregoing, it is an object according to the first aspect of the present invention to provide a thin-film magnetic head which is not liable to be damaged by the dielectric breakdown due to static electricity without providing additional steps as necessary in the above mentioned conventional system.

For accomplishing the above object, the present invention provides a thin-film magnetic head comprising a substrate and an electromagnetic transducer unit, said transducer unit being formed on said substrate and including a lower magnetic film, a magnetic gap layer, a coil conductor layer, an insulating layer and an upper magnetic film, characterized in that said substrate is formed of a material having an electric resistivity of not higher than 150 ohm-cm and that said lower magnetic film is directly attached to said substrate.

In the construction of the thin-film magnetic head of the present invention, the substrate is formed of a material having the electrical resistivity of not higher than 150 ohm-cm, and the lower magnetic film of the electromagnetic transducer unit is directly formed on the substrate, so that the electrostatic charges deposited on the lower magnetic film of the transducer unit may be expelled immediately to outside by means of the substrate and the arm, for example, supporting the thin-film magnetic head. Thus there is provided a thin film magnetic head in which the risk of dielectric breakdown of the insulating layer by the electrostatic charges and hence the risk of dielectric breakdown of the thin-film magnetic head by the electrostatic electricity may be eliminated.

SUMMARY OF THE DISCLOSURE (Second Aspect)

It is therefore an object according the Second Aspect of the present invention to provide a thin-film magnetic head in which a material having heat resistance and durability is used as a material for the insulating layer to improve the operational reliability of the magnetic head.

It is another object of the Second Aspect to provide a thin-film magnetic head having an improved structure as compared with the conventional thin-film magnetic head to improve the operational reliability of the magnetic head without increasing the production time or the number of production steps.

It is a further object of the Second Aspect to provide a thin-film magnetic head with high reliability and low noise even upon recording under a still higher density.

Still further objects of the present invention will become apparent in the entire disclosure.

For acomplishing the above objects, the Second Aspect of the present invention provides a thin-film magnetic head comprising an upper magnetic film and a lower magnetic film, both formed on a substrate, and a coil conductor layer and insulating layers, both formed between said upper magnetic layer and said lower magnetic film, characterized in that said lower magnetic film is formed as a uniform flat surface extending over at least a region where the coil conductor layer is formed, and at least a part of the end face of said lower magnetic film directed to an end face of a magnetic recording medium except a magnetic gap region of said lower magnetic film is receded from the end face facing the magnetic recording medium, and that said insulating layers are formed of an inorganic material.

In another phase of the Second Aspect, the end face of said lower magnetic film directed to an end face facing the magnetic recording medium is receded by an inclined surface thereof relative to said end face facing the recording medium in a region of said lower magnetic film other than the magnetic gap region to provide a thin-film magnetic head in which the amount of the stray (or leaking) magnetic flux in the direction along the width of the head track is reduced.

With the thin-film magnetic head according to the present invention, by forming the lower magnetic film as a uniform flat surface over at least the region in which the coil conductor layer is formed, and by forming the insulating layer of the inorganic material on the produced flat surface, the flat surface on which to form the coil conductor layer may be easily formed by the flat surface of the lower magnetic film, so that the flattening step by the resist material for formation of the coil conductor layer may be eliminated. Thus the inorganic material having excellent moisture-proofness and resistance to chemicals may be used to prevent deterioration of the insulating material with lapse of time. In addition, since the end face of the lower magnetic film except the region of the magntic gap is receded from the end face of the substrate facing the medium, the recording and/or reproducing performance of the thin-film magnetic head may be maintained in a practically satisfactory range, so that the thin-film magnetic head having the desired performance may be obtained with the least quantity machining operations following the formation of the lower magnetic film. Thus, by the adoption of the above mentioned two constructional features, namely the receded end face of the lower magnetic film and the insulating layer of the inorganic material, it has become possible to provide a simplified and highly reliable thin-film magnetic head which is not liable to deteriorate with lapse of time and in which the recording and/or reproducing performance is maintained at a predetermined desirable level.

BRIEF DESCRIPTION OF THE DRAWINGS

FIG. 1 is a side elevational view of a floating type thin-film magnetic head embodying the present invention (first aspect), as viewed from the air effluent end face and with the floating side directed upwards;

FIG. 2 is a cross-sectional view taken along the line II—II of FIG. 1, for illustrating mainly the construction of the electromagnetic transducer unit of the thin-film magnetic head shown in FIG.1.

Figure 3:
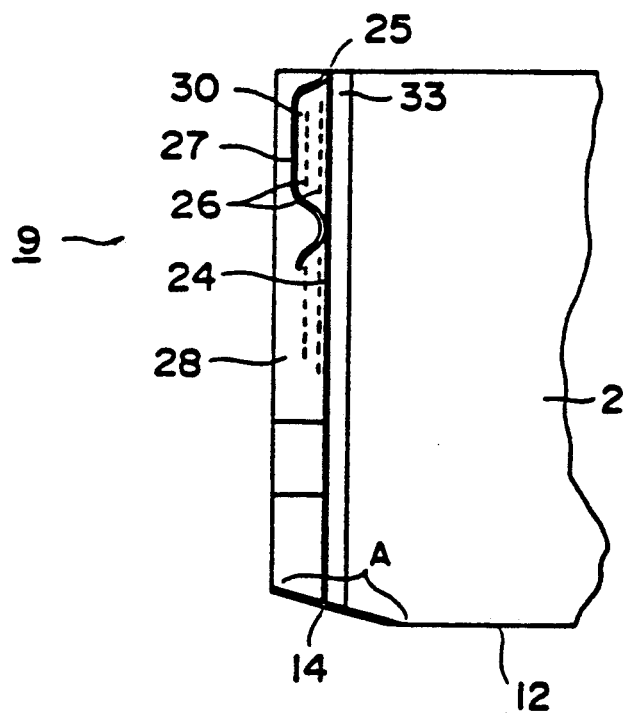
FIG. 3 is a cross-sectional view for illustrating mainly the construction of the electromagnetic transducer unit of a conventional thin-film magnetic head.

DETAILED DESCRIPTION OF THE PREFERRED EMBODIMENTS (First Aspect)

Non-magnetic or magnetic materials may be used as the substrate material.

Preferably, the lower magnetic film is formed by thin-film forming methods, such as, above all, sputtering.

As the substrate material, $Al_2O_3$-TiC with a resistivity of 0.002 ohm-cm, $Al_2O_3$-$TiO_2$ with a resistivity of 3.0 ohm-cm and Mn-Zn ferrite with a resistivity of 150 ohm-cm, may be employed. Insulating substrate materials such as non-magnetic magnetic ferrite with the resistivity of not less than 1000 ohm-cm or Ni-Zn ferrite with the resistivity of not less than $10^6$ ohm-cm is not to be used as the substrate material acording to the present invention because the object of the invention cannot be achieved with the substrate materials with these resistivity values.

In arriving at the above mentioned construction of the present invention, the following tests have been conducted.

Using $Al_2O_3$-TiC (alumina-titanium carbide) substrate, $Al_2O_3$-$TiO_2$ (alumina-titania) substrate, $Al_2O_3$-SiC substrate, Mn-Zn ferrite substrate, Ni-Zn ferrite and non-magnetic ferrite substrate, as the electrically conductive substrates, the lower magnetic film, insulating layers, the coil conductor layer, the magnetic gap layer, the upper magnetic film and the protective layer were directly stacked step by step through sputtering or vacuum deposition on the substrate for producing magnetic head samples. After a head gimbal assembly (HGA) was made, static electricity was applied to the magnetic head slider by a electrostatic destructor (dielectric breakdown tester) to check for possible dielectric breakdown of the thin-film magnetic head samples. The result is shown in Table 1.

It is seen from Table 1 that none of the thin-film magnetic head samples employing the substrates having the resistivity of not higher than 150 ohm-cm has been destructed by electrostatic electricity. The resistivity of the substrates is preferably 3 ohm-cm or less.

TABLE 1

| Possible Destruction of Various Substrates by Static Electricity | | |
|---|---|---|
| Substrate | Resistivity ($\Omega \cdot cm$) | Electrostatic dielectric breakdown |
| $Al_2O_3$—TiC | 0.002 | not |
| $Al_2O_3$—$TiO_2$ | 3.0 | not |
| $Al_2O_3$—SiC | $5 \times 10^8$ | occurred |
| Mn—Zn Ferrite | 150 | not |
| Ni—Zn Ferrite | $>10^6$ | occurred |
| Non-magnetic Ferrite | $>10^3$ | occurred |

Function

The static charges formed on the lower magnetic film directly depositted on the substrate are immediately transferred to the substrate, without raising the electrical potential of the lower magnetic film, so as to be conducted through the electrically conductive substrate material with a resistivity of not higher than 150 ohm-cm to exit to the ground side by means of, for example, an arm holding the thin-film magnetic head. Thus there is no possibility of the dielectric breakdown which would be otherwise caused by static electricity and which might lead to the destruction of the thin-film magnetic head. In addition, despite the simplified construction of the magnetic head, the lower magnetic film exhibits the intended magnetic performance. Besides, the lower magnetic film may be formed directly on the substrate by a thin-film forming step by a vapor deposition method, such as sputtering.

Embodiment (First Aspect)

The present invention will be explained in more detail by referring to the drawings.

FIG. 1 is a side elevational view of a floating type thin-film magnetic head embodying the present invention, as viewed from the air effluent side, with a floating surface being directed upwards. In this figure, the thin-film magnetic head 1 is constituted by a substrate 21, constituting a slider, and a pair of electromagnetic transduser units 29, formed on the air effluent side end face of the substrate 21 by the thin-film forming technique. A channel 23 is formed between the transducer units 29 on the substrate 21 for extending along the air flow. The coil conductor layers of the transducer units 29 are connected separately to terminals 36, 36 and thence connected to outside circuits, not shown.

Referring to FIG. 2, which is a cross-sectional view taken along the line II—II of FIG. 1, each electromagnetic transducer unit 29 has a magnetic gap 25 on the floating surface 22 of the substrate 21, and is constituted by a lower magnetic film 24, directly formed by sputtering on the end face of the substrate 21 of the magnetic or non-magnetic material, on the downstream side of the air flow, a coil insulating layer (or layers) 30 as well as coil conductor layers 26, formed on the lower magnetic film 24, an upper magnetic film 27 formed above the coil insulating layer(s) 30 and the coil conductor layers 26 and defining the magnetic gap 25 as a layer between it and the lower magnetic film 24, and a protective layer 28 overlying the upper magnetic film 27 for protecting the layers therebelow in their entirety.

On the substrate 21, a magnetic film, such as a film of Sendust or permalloy, as the lower magnetic film 24, is formed by sputtering directly, that is, without the interposition of an insulating film, contrary to the conventional system. In this case, thin-film forming techniques, such as vacuum depesition, may be employed. It is, however, preferred not to use the plating process because the desired magnetic properties cannot occasionally be obtained on account of the differential thermal expansion coefficients between the metal magnetic film and the substrate.

Above the lower magnetic film 24, there are formed the coil conductor layers 26 of Cu or Cu alloys, insulated from each other and from the magnetic films 24 and 27 by an insulating material such as $SiO_2$. These coil conductor layers 26 are connected by means of lead members (not shown) to the terminals 36, which are formed by the thin-film forming technique, similarly to the coil conductor layers 26.

The upper magnetic film 27 is formed of the same magnetic metal material as that of the lower magnetic film 24 and adapted to exchange signals with the magnetic recording medium, not shown, by means of a magnetic gap layer 25 formed between the upper magnetic film and the lower magnetic film 24. These signals are then exchanged with the coil conductor layers 26 so as to be then exchanged with outside equipment by means of the external terminals 36.

With the above described thin-film magnetic head, the electrostatic charges intruded onto the lower magnetic film 24 from the magnetic recording medium during recording or reproduction by the magnetic head floating on or slidingly contacted with the magnetic recording medium, or the electrostatic charges generated during transient storage or transport as a result of the magnetic heads rubbing against each other or with storage or transport containers and eventually deposited on the lower magnetic film 24, may reach the substrate 21 immediately and discharged to outside by means of the electrically conductive substrate. Therefore, in contrast with the conventional thin-film magnetic head, which suffers from the dielectric breakdown the insulating film between the lower magnetic film and the substrate, there is no risk of destruction ascribable to the electrostatic electricity.

Meanwhile, since the lower magnetic film is formed in the present embodiment by the film-forming technique instead of by plating, there is no risk that magnetic properties of the lower magnetic film be changed at the interface with the substrate, so that control of the magnetic characteristics of the lower magnetic film may be facilitated and the magnetic characteristics may be maintained more easily even under mass production of the magnetic heads.

It is to be noted that, although the two coil conductor layers are employed in the above described embodiment, the present invention may be applied to the thin-film magnetic head employing single or, three or more coil conductor layers with comparable favorable results.

Second Aspect

The Second Aspect of the present invention has been made on the basis of the following finding.

According to the Second Aspect, an inorganic material which is hardly degraded with lapse of time is used as an insulating material, in view that, in conventional thin-film magnetic heads, the organic material of, for example, the photoresist, used as the insulating material, is liable to deterioration with lapse of time, which has been the cause of the lowered operational reliability of the conventional thin-film magnetic head. However, if the inorganic material is used in this manner in place of the photoresist, the level difference between the substrate surface and the lower magnetic film having a predetermined thickness of usually 3 to 6 $\mu$m cannot be flattened out by application of an insulating material, as in the case of the conventional thin-film magnetic head, so that a flat surface for forming the coil conductor layer by sputtering or vacuum deposition etc. in the subsequent step cannot be obtained.

If the flat surface is to be obtained by, for example, sputtering the inorganic material, the above-mentioned level difference cannot be flattened out to provide the flat surface unless a film is formed to a thickness of the order of 7 to 8 $\mu$m and subsequently removed such as by an etch-back method. However, the film with a thickness of an order of 7 to 8 $\mu$m can be produced only by an extremely prolonged sputtering process, resulting in significant increase in production costs.

In view of the foregoing, the lower magnetic film is formed on the substrate to provide a flat film surface which, according to the present invention, is much wider than the upper magnetic film, in contrast to the conventional magnetic head shown in and described in connection with FIG. 8. Thus the lower magnetic film is formed as a uniform flat surface extending preferably over the entire end face on the air flow out end of the substrate, or at least over the region thereof in which the coil conductor layer is to be formed, thereby dispensing with the step of forming the flat surface for formation of the coil conductor layer as in the conventional practice. In this manner, the layer of the insulating inorganic material may be reduced as a function of its insulating properties and hence can be formed in a shorter time by any of known thin-film forming methods, such as by sputtering.

Figure 10:
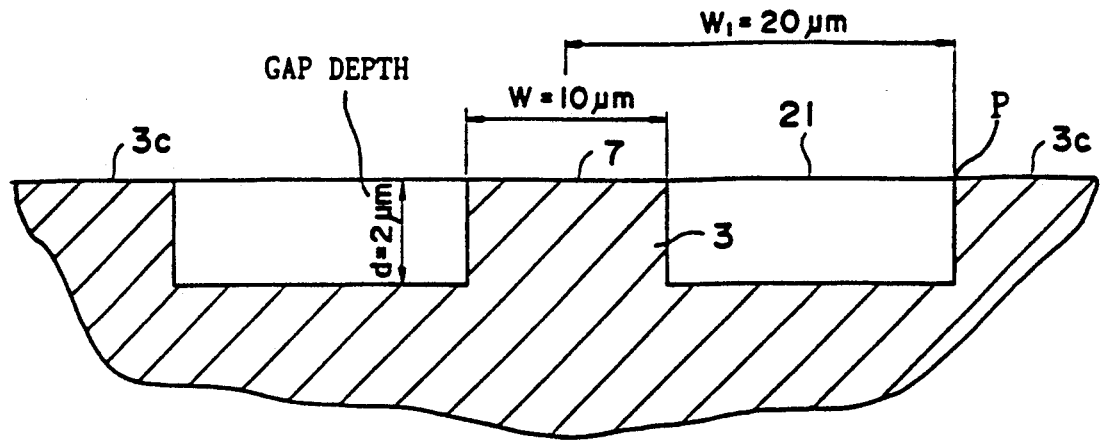

On the other hand, if the lower magnetic film functioning as the lower magnetic pole is formed on the entire surface of the substrate throughout a predetermined range thereof, the region of the lower magnetic pole other than the magnetic gap region becomes proximate to the surface of the magnetic recording medium. As a result, as shown in FIG. 10, schematically showing the status of the stray magnetic flux $\Phi_1$ as viewed from the end face of the magnetic gap, the magnetic fluxes interact with magnetic recording on the adjacent magnetic tracks on the magnetic recording medium due to the increased stray magnetic flux at the proximity of the magnetic gap. According to the present invention, a part of the end face of the lower magnetic pole which is directed to the end face facing the magnetic recording medium and which is disposed at a region other than the magnetic gap region is receded from the end face facing the magnetic recording medium. It has been found that a thin-film magnetic head may be obtained in this manner in which signal interference may be suppressed to a practically insignificant small value.

By providing the lower magnetic film as a uniform flat surface over at least the range thereof in which the coil conductor is formed, it becomes unnecessary to provide a flat surface by application of the resist material. The surface of the inorganic insulating material formed on the flat surface of the lower magnetic film such as by sputterring may be obtained easily as a flat surface on which the coil conductor layer may be formed directly.

Examples (Second Aspect)

Figure 4:
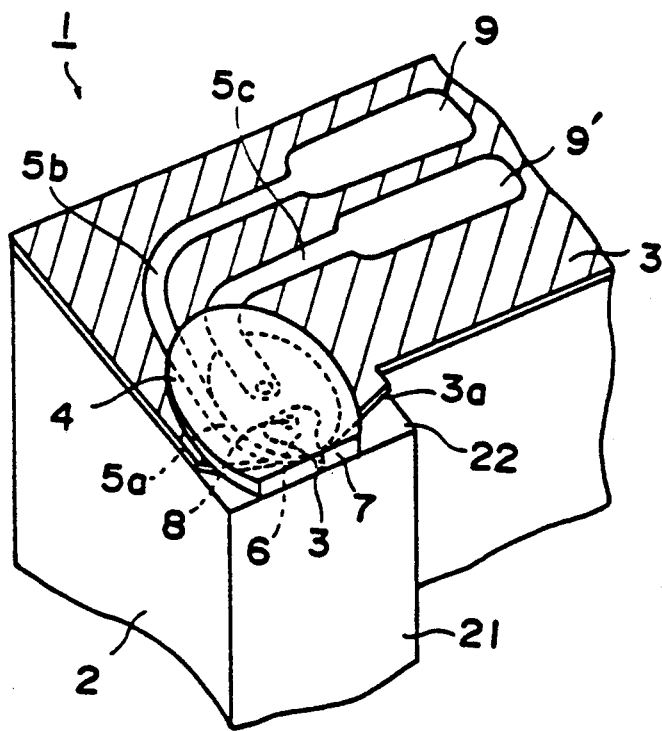
FIG. 4 is a perspective view of a thin-film magnetic head according to a preferred embodiment of the present invention (second aspect)
Figure 11:
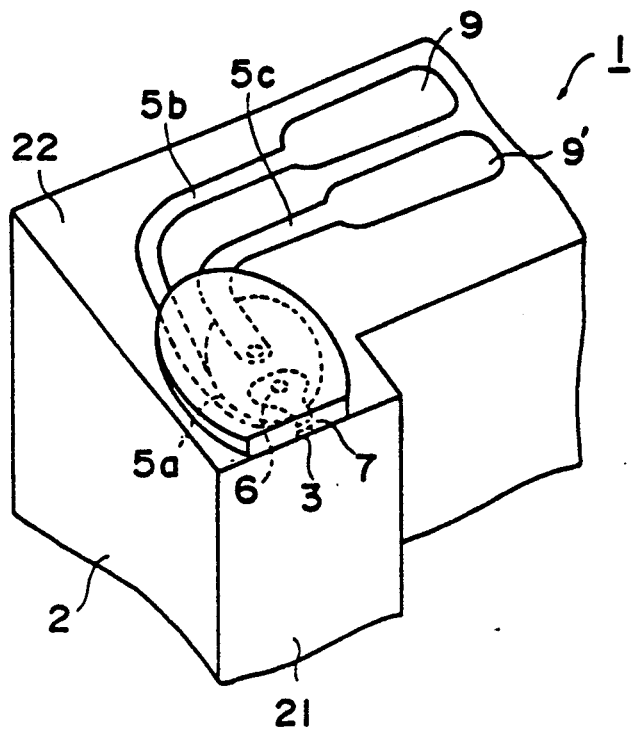
FIG. 11 is a perspective view showing the construction of an electro-magnetic converting element section of a conventional thin-film magnetic head.
Figure 12:
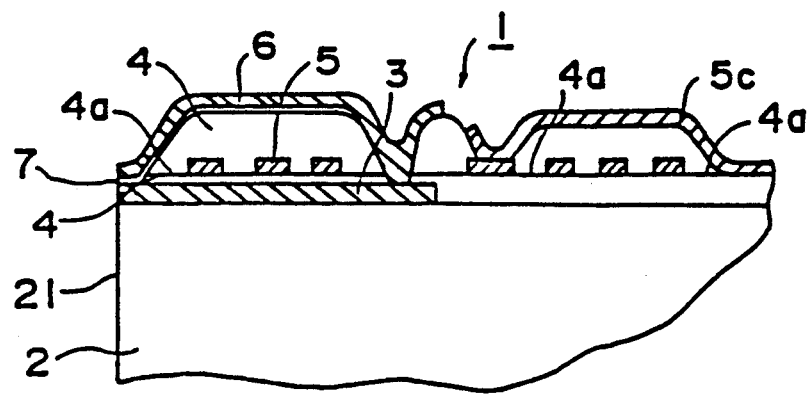
FIG. 12 is a cross-sectional view showing an essential portion of the thin-film magnetic head shown in FIG. 11.
Figure 13:
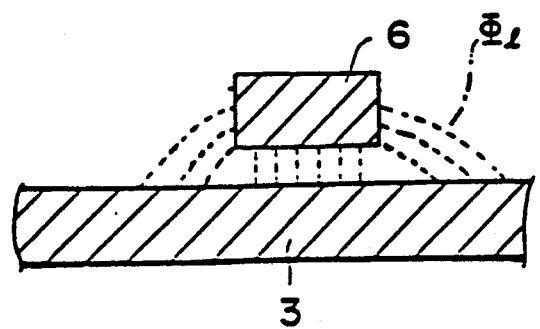
FIG. 13 is a schematic view for illustrating the stray magnetic flux in the vicinity of the magnetic gap.

The construction of a thin-film magnetic head according to an embodiment of the Second Aspect will be explained by referring to FIGS. 4 to 6. The thin-film magnetic head 1 shown in the drawings is adapted to a magnetic head for a hard disc unit, similarly to the conventional thin-film magnetic head shown in FIG. 11. FIG. 4 is a perspective view of the thin-film magnetic head of the present embodiment, FIG. 5 is a schematic plan view showing an electro-magnetic converting element section, and FIG. 6 is a cross-sectional view taken along line VI—VI of FIG. 5.

Figure 5:
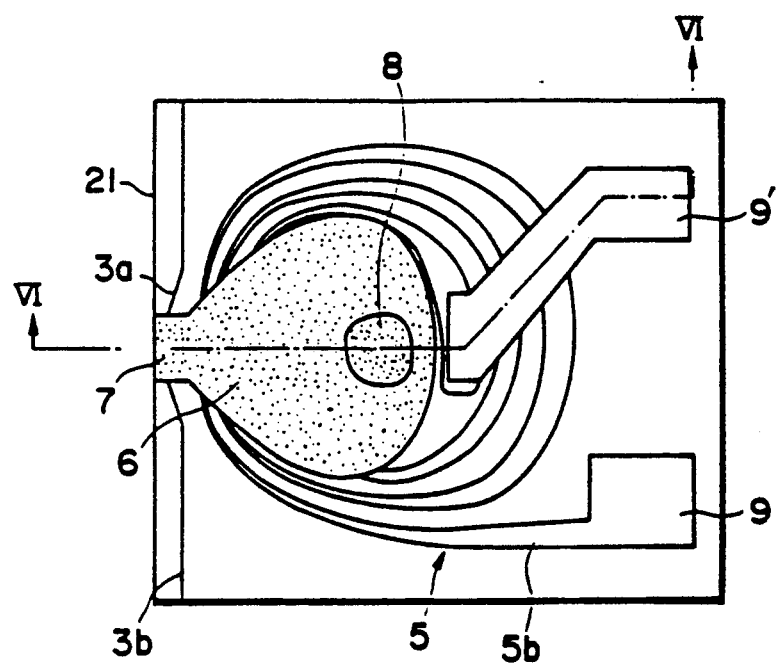
FIG. 5 is a schematic plan view showing an electromagnetic converting section for illustrating the construction of the thin-film magnetic head shown in FIG. 4.
Figure 6:
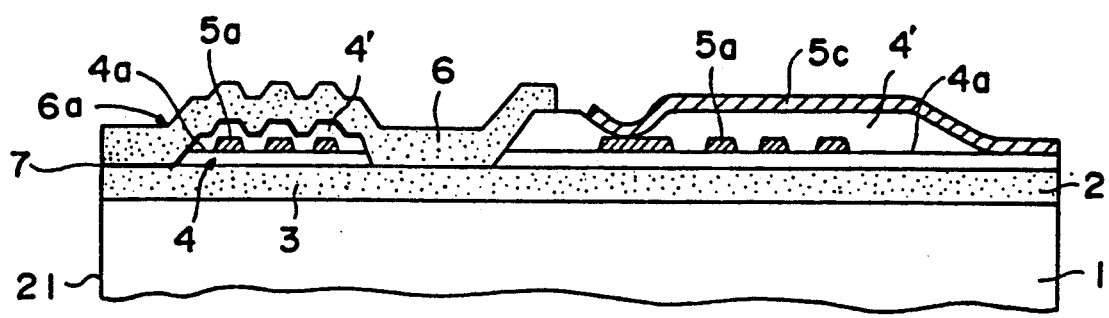
FIG. 6 is a cross-sectional view taken along the line VI—VI of FIG. 5.

In FIGS. 4 to 6, a lower magnetic film 3 is formed by sputtering over substantially the overall surface of a rear end surface 22 on the air flow out end of a substrate 2 which is formed of a magnetic or non-magnetic material. An insulating layer 4 of an inorganic material is formed by sputtering on the lower magnetic film 3, and a coil conductor layer 5 is formed on the insulating layer 4. This layer 5 is formed of a coil part 5a for signal conversion with the magnetic poles and one 5b of lead wires 5b, 5c for electrically connecting the coil part 5a with external terminals 9 and 9'.

The other end (central end) of the coil part 5a is connected with other 5c of the lead wires connected to the external terminal 9', whereas the lead wire 5c is separated from the coil part 5a by the insulating layer 4:

The coil conductor layer 5 may be formed as a single layer or as two or more layers, and are formed in alternation with an insulating layer or layers 4 by thin-film forming method. The other lead wire 5c connected with the central level of the coil part 5a is formed after formation of the upper insulating layer 4' of the coil part 5a. Subsequently, a part of the lower magnetic pole lying on the end face thereof facing the magnetic recording medium (i.e., two regions neighboring on the magnetic gap region) is etched off to form inclined surfaces 3a and receded surfaces 3b. An upper magnetic pole 6 is formed after formation of the coil conductor layer 5 and the insulating layers 4, 4'. The lower magnetic pole 3 and the upper magnetic pole 6 are ultimately trimmed, such as by etching, so as to be of the same contour within the region of the magnetic gap 7.

Referring to FIG. 5, in which the electro-magnetic converting section of the present thin-film magnetic head is shown in a schematic plan view, the inclined surface 3a of the lower magnetic film 3 is formed at an angle of 30° with respect to the end face 21 facing the magnetic recording medium, and the end face of the lower magnetic film further extends on the both sides of the inclined surfaces 3a as receded edge surfaces 3b parallel to the end face 21 along the track width at a predetermined distance from the end face 21. Turning to an example of the illustrative size of the magnetic gap 7, the track width w is 10 μm, the gap depth d is 2 μm, and the gap length is 0.25 μm. The gap depth is defined as the distance as measured from the end face 21 facing the medium to a point of deflection 6a of the upper magnetic film 6 along its thickness (FIG. 6). The thickness of the upper magnetic film 6 is 4 to 6 μm, the thickness of the lower magnetic film 3 is similarly 4 to 6 μm, the distance between the end face 21 and the receded surface 3b of the lower magnetic film 3 parallel to the end face 21 is 15 μm, and the distance between the forward end face of the magnetic gap and a rear contact section 8 between the upper and lower magnetic films is approximately 200 μm.

The width of the upper magnetic film 6 (vertical length in FIG. 5) is selected in general to be 100 to 250 μm. The substrate 2 has a rear end face 22, on substantially the overall surface of which lower magnetic film 3 is formed, and which has a transverse length along the track width of 2 mm and a height orthogonal thereto of 0.6 mm. Although not shown, a protective film is formed on the electro-magnetic converting element in its entirety, as in the conventional thin-film magnetic head.

The contour of the thin-film magnetic head of the present embodiment of the present invention has been selected as a result of the following considerations.

Figure 7:
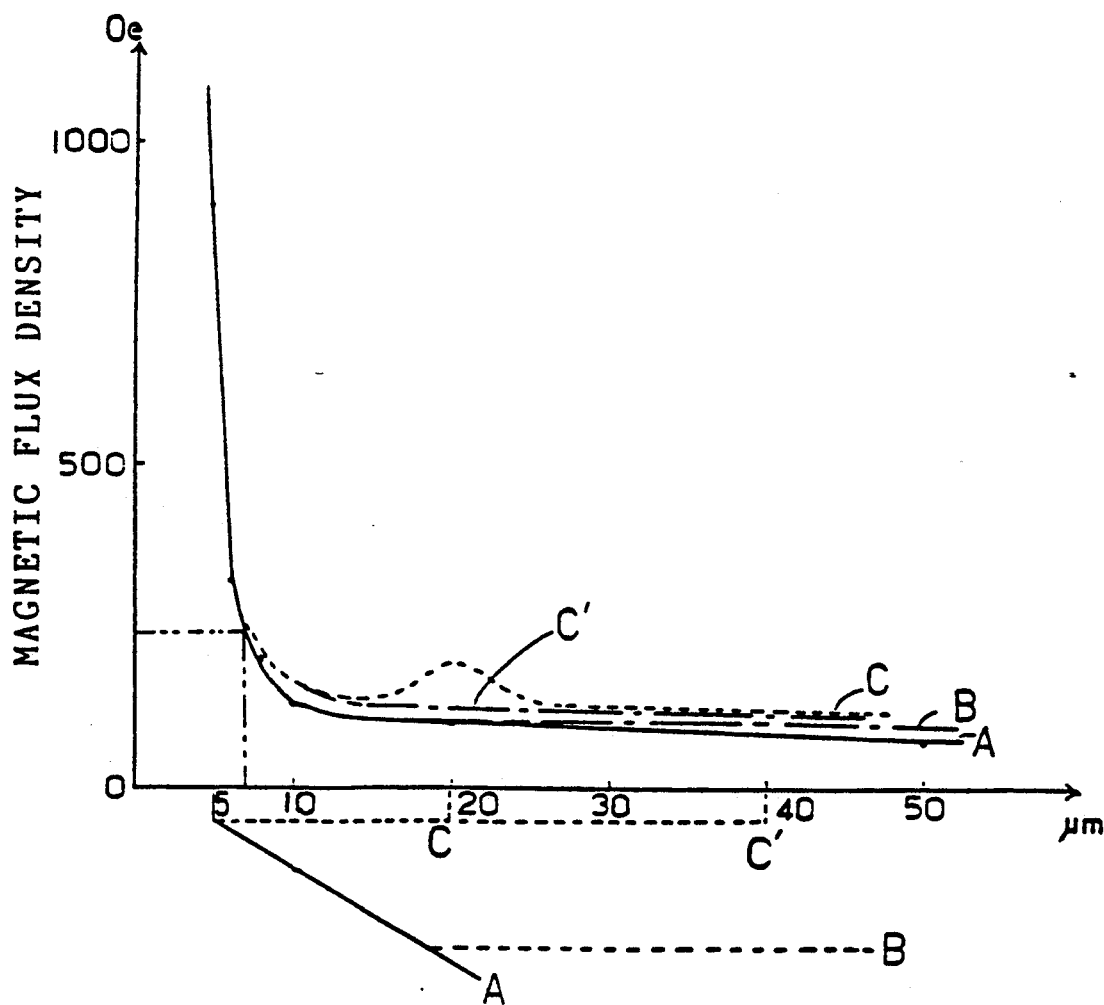
FIG. 7 is a graph showing the results of computer simulation for comparing the recording performance of the electro-magnetic converting element sections of various thin-film magnetic heads.

FIG. 7 shows a result of computer simulation of the recording performance of thin-film magnetic heads of the present embodiment in which the lower magnetic film is formed substantially on the entire substrate surface along its width, and the recording performance of a conventional thin-film magnetic head.

Thus, FIG. 7 shows the relation between the strength of the magnetic field (Oe) at a point disposed at a distance of 0.15 μm from the end face of the substrate facing the recording medium, and the distance from the center along the track width, when a predetermined recording current (30 mAp-p) is applied to three different thin-film magnetic heads, that is a conventional thin-film magnetic head and two thin-film magnetic heads having the lower magnetic films of two different types formed on the overall surface of the substrate along its width. The contour of the corresponding lower magnetic films is shown in the lower portion of FIG. 7 for facility of comparison of the shape and the size of the lower magnetic films and the values plotted in the graph of FIG. 7. The magnetic films are at the beginning of saturation under the applied current.

The distance of 0.15 μm represents the usual floating height of the floating type head slider. Thus the points disposed at said distances on the substrate 2 are assumed as those disposed on the surface of the magnetic recording medium. It will be noted that such recording performance is preferred in which a strong magnetic field is produced within the extent of the track width and as small a magnetic field as possible is produced outside the track width. Meanwhile, the track width of the magnetic gap is 10 μm, the gap depth is set 2 μm, the thickness of the magnetic layers is set unanimously 4 μm and the coercivity Hc of the recording medium is set 1500 Oe.

Figure 8:
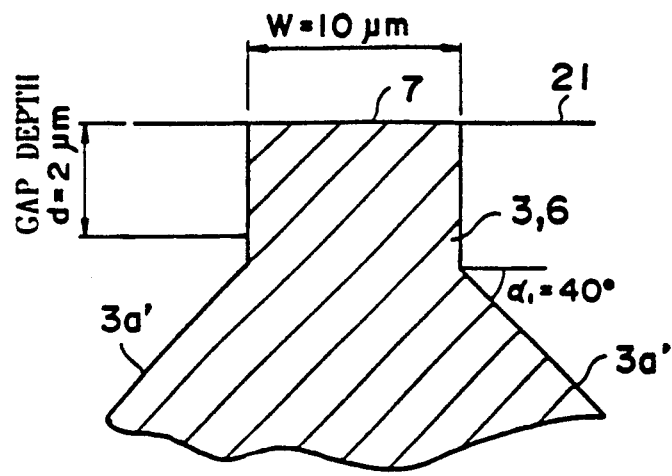
FIG. 8 is a schematic plan view showing the end faces of upper and lower magnetic films of a conventional magnetic head facing the magnetic recording medium.
Figure 9:
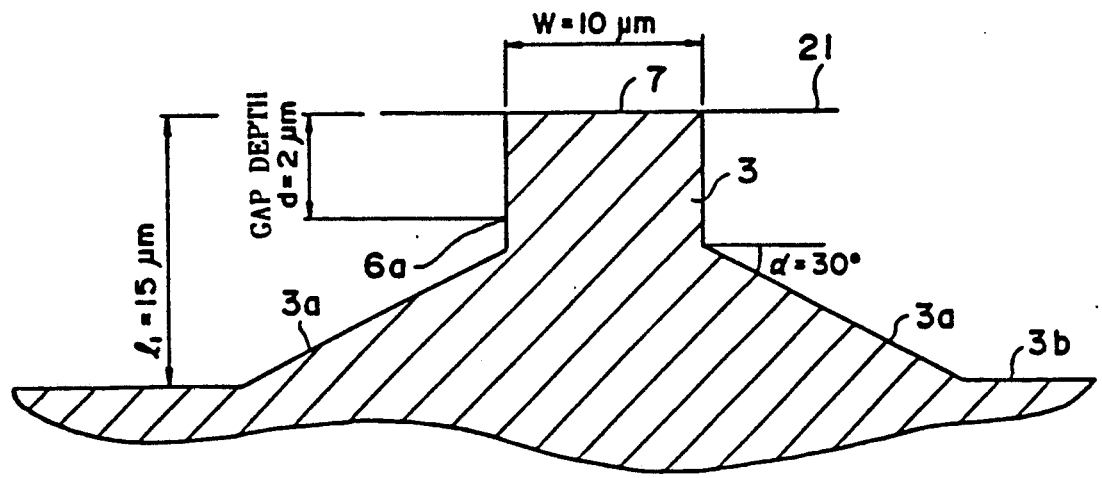
FIGS. 9 and 10 are schematic plan views showing the end faces of the lower magnetic film of the thin-film magnetic heads according to embodiments of the present invention (second aspect)

A solid line A in FIG. 7 shows a curve of the simulated recording performance of a conventional magnetic head in which the upper and lower magnetic poles are substantially of the same size and which are provided with the upper and lower magnetic films 3, 6 having the contour of the end faces as shown in FIG. 8. Similarly, a chain line B shows the performance of a magnetic head according to an embodiment of the present invention which is provided with the lower magnetic film 3 having a contour of the end face as shown in FIG. 9 and an upper magnetic film 6 shown in FIG. 8, while a chain-dotted line C' shows the performance of a magnetic head according to another embodiment of the present invention which is provided with a lower magnetic film having a contour of the end face as shown in FIG. 10 and an upper magnetic film having the contour of the end face as shown in FIG. 8. It will be noted that the upper and the lower magnetic films of the conventional magnetic head shown in FIG. 8 are of the same contour and provided with inclined surfaces 3a' within the ranges adjacent to the magnetic gap.

As may be seen from curves A an B in FIG. 7, the magnetic head shown in FIG. 9 according to the embodiment of the present invention has the recording performance comparable to that of the conventional magnetic head. However, in the magnetic head shown in FIG. 10 in which the end face of the lower magnetic pole facing the recording medium has an exposed portion 3c protruding in the direction of the floating surface in a region outside the track width, the protruding portion 3c being flush with the end face of the lower magnetic pole, if the distance w1 of a terminal portion P towards the magnetic gap of the exposed protruding portion 3c from the center of the magnetic gap is 20 μm, a strong stray magnetic field is produced at the terminal portion P of the exposed protruding portion 3c, as shown at C in FIG. 7. Such magnetic head is not suited as the thin-film magnetic head because a strong magnetic field is produced in the region outside the track width so that interference results with the adjacent tracks. It is therefore necessary to set the distance w1 so that w1≧40 μm to separate the protruding portion 3c of the lower magnetic film 3 by a distance of not less than 40 μm from the center of the magnetic gap. As shown in FIG. 7, it should be noted that the interference with the adjacent tracks on the recording medium unavoidably results if, in the above simulaton, the recording magnetic field shows a higher value beyond the distance of 7 μm from the gap center along the track width, that is, beyond 2 μm from the extent of the track width. Namely, the solid curve A represents the conventional thin film magnetic head having the (optical) track width 10 μm. The effective track width becomes about 14 μm, with both sides thereof having been extended by 2 μm, respectively. The stray magnetic flux density should be less than the value of the curve A at the distance of 7 μm in order to avoid the interference. The small peak of the curve C has approximately the same level as the value of the curve A at the distance 7 μm. Thus this peak should be eliminated.

The following has turned out from the results of the simulation. Since the recording performance of the curve C' is also satisfactory, if the lower magnetic film is separated from the end face of the substrate facing the recording medium by at least 2 μm, in the case of the thin-film magnetic head used with a magnetic recording medium with the coercivity of 1500 Oe, magnetic interference with the adjacent tracks may be avoided at the time of signal recording and/or reproduction, so that the thin-film magnetic head may be used satisfactorily for practical applications. The above distance is preferably of an order of 10 μm. This upper limit value is defined as the limit of the transverse distance at which the neighboring coil conductor layers are disposed.

In the case of the recording medium having a coercivity of 1000 Oe, the preferred value of the distance between the end face of the substrate facing the medium and the end face of the lower magnetic layer is analogously set an order of 5 μm.

With the thin-film magnetic head of the present embodiment of the present invention, it suffices to form the insulating layer 4 of the inorganic material to the thickness of, for example, 1 to 2 μm, such as by sputtering, on the lower magnetic film 3, in advance of the formation of the coil conductor layer 5, while the subsequent step of forming a flat surface for the coil conductor layer 5 may be eliminated. In this manner, the production process may be simplified as compared to the conventional manner for preparing the thin-film magnetic head in which it has been necessary to apply a resist on the overall surface of the lower magnetic film after formation thereof and to flatten out the applied resist material through a removing step to provide the desired flat surface.

It should be noted that modifications apparent in the art may be done without departing from the gist and scope of the present invention as hereinabove disclosed and hereinbelow claimed as appended claims.

What is claimed is:

1. A thin-film magnetic head comprising an upper magnetic film and a lower magnetic film, both formed on a substrate, and a coil conductor layer and insulating layers, both formed between said upper magnetic film and said lower magnetic film, said upper and lower magnetic films defining a magnetic gap communicating with an end face of said magnetic head which opposes a recording medium, wherein said lower magnetic film is formed as a uniform flat surface extending over at least a region where the coil conductor layer is formed, said lower magnetic film including a first portion which extends to said end face proximate said gap and a second portion on opposite sides of said gap which is receded from the end face, and wherein said insulating layers are formed of an inorganic material and contact receded end surfaces of said second portion such that interference associated with magnetic flux generated from neighboring tracks is suppressed.

2. The thin-film magnetic head as defined in claim 1, wherein said lower magnetic film includes an inclined portion interconnecting said first and second portions.

3. The thin-film magnetic head as defined in claim 2, wherein the inclined portion is disposed at an angle of about 30 degrees with respect to a line parallel to said end face of said head.

4. The thin-film magnetic head as defined in claim 2, wherein the inclined portion begins at a gap depth of not less than 2 μm adjacent the magnetic gap.

5. The thin-film magnetic head as defined in claim 1, wherein said second portion of the lower magnetic film is receded by a distance not less than a depth of said gap.

6. The thin-film magnetic head as defined in claim 5, wherein said second portion of the lower magnetic film is receded for a distance of at least 40 μm from a center of a width of a magnetic gap region of said end face in the direction of track width.

7. The thin-film magnetic head as defined in claim 1, wherein said lower magnetic film is directly disposed on the substrate having an electric resistivity of not more than 150 ohm-cm.

8. The thin-film magnetic head as defined in claim 1, wherein the upper magnetic film has a different configuration from that of the lower magnetic film except for a region defining the magnetic gap where the configurations are the same.

9. The thin-film magnetic head as defined in claim 1 wherein end surfaces of said upper and lower magnetic films which define said end face are coplanar.

* * * * *